United States Patent [19]

Kennedy

[11] 3,723,973

[45] Mar. 27, 1973

[54] DATA COMMUNICATION CONTROLLER HAVING DUAL SCANNING

[75] Inventor: James A. Kennedy, Phoenix, Ariz.

[73] Assignee: Honeywell Information Systems Inc.

[22] Filed: Sept. 30, 1970

[21] Appl. No.: 76,787

[52] U.S. Cl. ....................340/172.5

[51] Int. Cl. ....................G06f 3/00

[58] Field of Search ....................340/172.5

[56] References Cited

UNITED STATES PATENTS

| | | | |
|---|---|---|---|
| R26,984 | 11/1970 | Hirvela | 340/172.5 |
| 3,534,339 | 10/1970 | Rosenblatt | 340/172.5 |
| 3,618,039 | 11/1971 | Baltzly | 340/172.5 |
| 3,281,793 | 10/1966 | Oeters et al. | 340/172.5 |
| 3,350,697 | 10/1967 | Hirvela | 340/172.5 |
| 3,331,055 | 7/1967 | Betz et al. | 340/172.5 |
| 3,407,387 | 10/1968 | Looschen et al. | 340/172.5 |

*Primary Examiner*—Harvey E. Springborn

*Attorney*—Edward W. Hughes, Lloyd B. Guernsey, Frank L. Neuhauser, Oscar B. Waddell and Joseph B. Forman

[57] ABSTRACT

A data communications controller connected to a plurality of subchannels scans all subchannels when a priority switch is open. When the priority switch is closed a selector switch can be used to choose one of several combinations of subchannels which are awarded priority over other subchannel being scanned.

1 Claim, 11 Drawing Figures

INVENTOR.
JAMES A. KENNEDY
BY Floyd B. Guernsey

Patented March 27, 1973 3,723,973

9 Sheets-Sheet 6

Patented March 27, 1973

3,723,973

9 Sheets-Sheet

DATA COMMUNICATION CONTROLLER HAVING DUAL SCANNING

BACKGROUND OF THE INVENTION

The present invention pertains to data communications systems and more specifically to a data communications controller which can be used to scan all of the subchannels connected thereto when a priority switch is open. When the priority switch is closed a selector switch on the communications controller can be used to choose one of several combinations of subchannels which are awarded priority over other subchannels being scanned.

Electronic data processing has rapidly become a necessary adjunct to the everyday business and provides not only means for calculating, accounting and general data processing, but also provides a source of business management information. To incorporate a data processing system into a business frequently requires a transmission for entry into the system over long distances. Terminal devices convert data from human readable form into binary form and transmit this data over wires or microwave relay systems from the terminal device to the data processor. The data processor operates upon the data received and sends a return message to the terminal device. The data processor operates at a speed which is many times as fast as the operating speed of the terminal devices. To provide efficient use of the data communications equipment a control module such as a communications controller is connected between the terminal devices and the data processor. These terminals devices generate a wide variety of message code sets, character lengths and bit rates. The data is transmitted a bit at a time from the terminal devices to the subchannels which temporarily store the data and then sends the data to the processor. The rate of transmission of the data from the terminal device is much slower than the operating speed of the data processor so that there is a considerable period of time between the receipt of the first data bit from terminal number one and the receipt of a second data bit from this same terminal. This means that the communications controller can receive a first data bit from terminal device number 1, then receive a data bit from terminal device number 2, etc. and return back to terminal number 1 in time to receive the second data bit from terminal device number 1. The communications controller is designed so that it continuously scans through all of the subchannels connected to the communications controller and receives 1 bit at a time from each of these subchannels. However, if some of the terminal devices provide data bits at a higher rate it may be advantageous to receive more than 1 data bit from a high speed terminal device before proceeding to one of the lower speed terminal devices. Therefore, it is desirable that a priority system be used such that the higher speed devices receive a higher priority and be scanned several times while the lower speed devices are scanned or are connected to the controller only a single time. It is therefore advantageous to develop a communications controller having a dual scanning system so that all of the subchannels connected to the controller can be scanned in order when there is no high speed terminal device connected to the subchannel, but to assign priority to a terminal device having a higher speed when it is connected to the controller.

It is, therefore, an object of this invention to provide a communications controller having a dual scanning system.

Another object of this invention is to provide a new and improved communications controller having a plurality of degrees of priority of scanning.

A further object of this invention is to provide a communications controller having a scanning system which scans all of the subchannels when no high priority signals are received by the controller and which scans a selected few of the subchannels when a high priority signal is received by the controller.

Still another object of this invention is to provide a communications controller having a scanning system which can be used to scan a predetermined number of subchannels when a priority signal is received by the controller and which scans all subchannels when no priority signal is received by the controller.

SUMMARY OF THE INVENTION

The foregoing objects are achieved in accordance with one embodiment of the present invention by employing a communications controller which uses a dual scanning system. A normal scanner scans each of the subchannels in turn. A priority scanner can be used to scan the priority subchannels when any of these priority subchannels request such action. When no priority requests are received the communication controller returns to the normal scanning.

Other objects and advantages of this invention will become apparent from the following description when taken in connection with the accompanying drawings.

DESCRIPTION OF THE PREFERRED EMBODIMENT

Since the present invention pertains to the data processing and to data communications techniques, a description thereof can become very complex; however, it is believed unnecessary to describe all of the details of the data communication system to completely describe the present invention. Therefore, most of the details that are relatively well known in the art will be omitted from this description. Even though details will be eliminated a basic description will be given of the entire system to enable one skilled in the art to understand the environment in which the present invention is placed. Accordingly, reference is made to FIG. 1 showing a simplified block diagram of a data communication system which uses the present invention.

Figure 1:
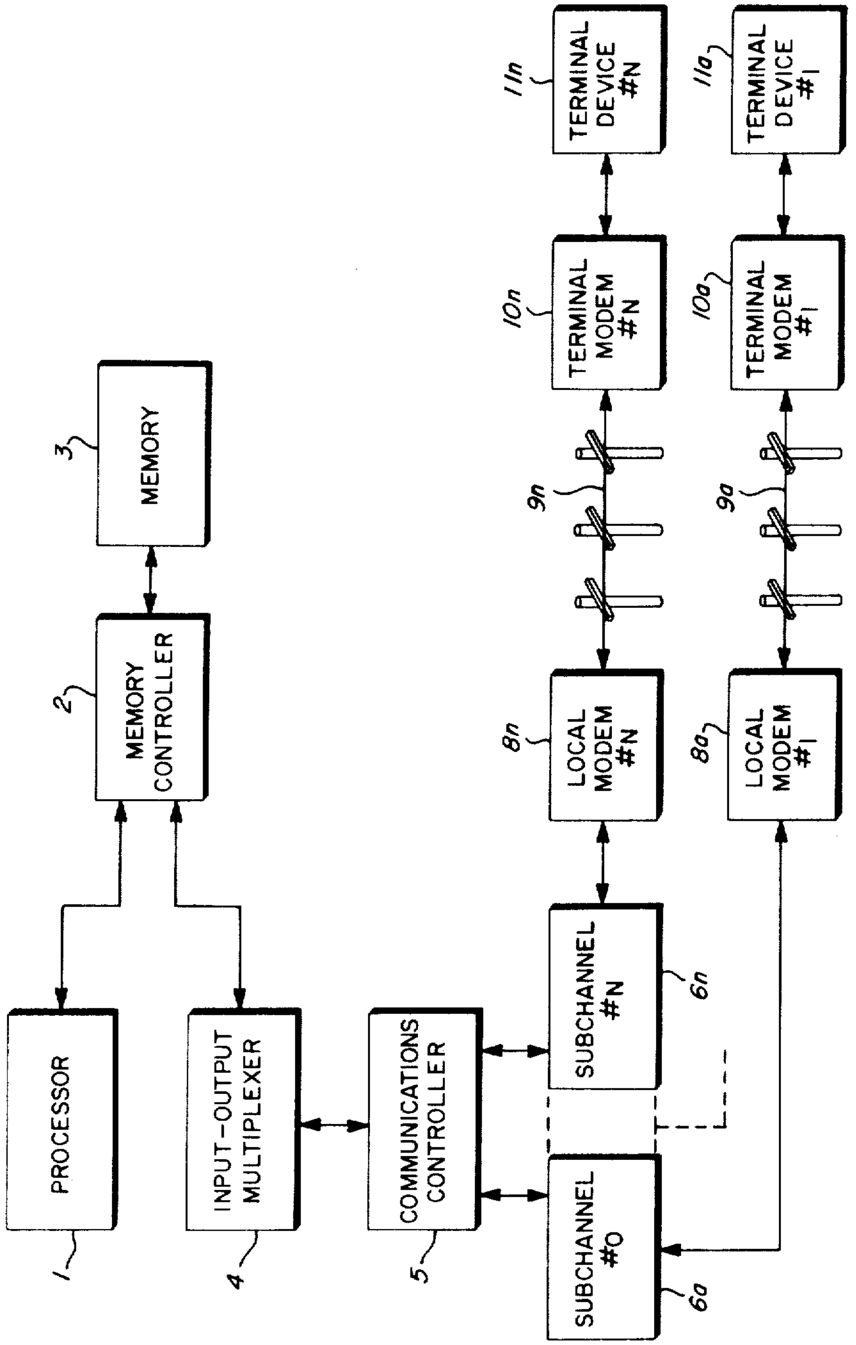
FIG. 1 is a simplified block diagram of a data communications systems in which the present invention may be used.

The data communication system shown in FIG. 1 includes a data processor 1, a memory controller 2, a memory 3, an input/output multiplexer 4, a communications controller 5, and a plurality of subchannels 6a–6n. The data processor manipulates data in accordance with instructions of a program. The processor receives an instruction, decodes the instruction and performs the operation indicated thereby. The operation is performed on data received by the processor and temporarily stored thereby during the operation. The series of instructions are called a program and include decodable operations to be performed by the processor. The instructions of the program are obtained sequentially by the processor and together with the data to be operated upon, are stored in the memory. The memory 3 shown in FIG. 1 may form many of several well known types; however, most commonly, the main memory is a random access coincident current type having a plurality of addressable locations each of which provides storage for a word. The word may form data or instructions and may contain specific fields useful in a variety of operations. Normally, when the processor is in need of data or instructions it will generate a memory cycle and provide an address to the memory. The data or word stored in the address location will subsequently be retrieved from memory and provided to the data processor 1.

A series of instructions comprising a program are usually "loaded" into the memory at the beginning of the operation and thus occupy a "block" of memory which normally must not be disturbed until the program has been completed. Data to be operated upon by the processor in accordance with instruction of the stored program is stored in memory and is retrieved and replaced in accordance with the binary coded instructions.

Communication with the data processing system usually takes place through the media of input/output devices such as magnetic tape handlers, paper tape readers, punched card readers, and remote terminal devices. To control the receipt of information from the input/output devices and to coordinate the transfer of information to and from such devices, an input/output control means is required. Thus, an input/output controller or input/output multiplexer is provided and connects the data processing system to the variety of input/output devices. The input/output multiplexer coordinates the information flow to and from the various input/output devices and also awards priority when more than one input/output device is attempting to communicate. Since input/output devices are usually electromechanical in nature and necessarily have operating speeds which are much lower than the remainder of the data processing system, the input/output multiplexer provides buffering or temporary storage to enable the processing system to proceed at its normal rate without waiting for the time consuming communication with the input/output device.

The input/output multiplexer shown in FIG. 1 may have a plurality of input/output devices connected to the input/output multiplexer or the input/output controller in the same manner as FIG. 1 of U.S. Pat. No. 3,413,613 by Bahrs et al. The communications controller 5 shown in applicant's FIG. 1 appears to the input/output multiplexer 4 to be an input/output device, but this communications controller in turn controls a plurality of subchannels which may be connected through modems and telephone lines to terminal devices.

Binary information which may be supplied from the memory to the subchannel 6a–6n, is converted by one of the local modems 8a–8n into modulated information which may be sent over telephone lines 9a–9n to one of the terminal modems 10a–10n. A terminal modem converts a modulated information into binary information for use by a corresponding one of the terminal devices 11a–11. Binary information which is generated by one of the terminal devices 11a–11n is converted by one of the terminal modems 10a–10n into modulated information which is sent over the telephone lines to a corresponding local modem 8a–8n, which converts the information into binary information again for use by a corresponding one of the subchannels 6a–6n. The local modems and the terminal modems may either receive modulated information and convert the modulated information into binary information or they may receive binary information and convert it into modulated information.

For a complete description of the processor of FIG. 1 and the instant invention which is embodied in such a processor, reference is made to the above U.S. Pat. No. 3,413,613 issued to David L. Bahrs et al. and assigned to the assignee of the present invention. More particularly, FIGS. 10–38 of the drawings; column 10, line 67 to column 32, line 21 of U.S. Pat. No. 3,413,613 are incorporated herein by reference and are made a part of the instant patent application.

Memory device 3 may be of the type disclosed in U.S. Pat. No. 3,521,240 issued to David L. Bahrs, John F. Couleur, and Albert L. Beard, and assigned to the assignee of the present invention.

A more complete description of the operation of a data communication system is disclosed in a copending application by James A. Kennedy, Aldis Klavins and Robert J. Koegle, entitled "DATA COMMUNICATION SYSTEM", now U.S. Pat. No. 3,618,031. This application is assigned to the assignee of the present invention and was filed on June 29, 1970. A portion of one of the subchannels 6a–6n is shown in more detail in FIGS. 2a and 2b and a portion of the communications controller 5 is shown in FIGS. 3a, 3b and 3c. The communications controller of FIG. 3a, 3b, 3c includes a high priority scanner 84, a normal scanner 88 and a channel enable decoding matrix 94 which supplies channel enable signals to the subchannels 6a–6n. The controller of FIGS. 3a, 3b and 3c scans each of the subchannels in turn by sequentially providing an enable signal to each of the subchannels. The controller has a plurality of priority switches to enable the controller to scan only a predetermined number of high priority subchannels when a predetermined number of these priority switches are closed. When all of the priority switches are open, the controller sequentially provides enable signals to each of the subchannels 6a–6n of FIG. 1.

The controller shown in FIGS. 3*a*, 3*b* and 3*c* is designed to scan 32 subchannels with the normal scanner and to scan either 2, 4, 8 or 16 subchannels as high priority subchannels when priority switches in the controller are closed and priority signals are received from the subchannels. It should be understood that the controller in FIGS. 3*a*, 3*b* and 3*c* can be changed to scan a greater or lesser number of subchannels by changing the number of elements in the scanners.

AND-GATES

Figure 2A:
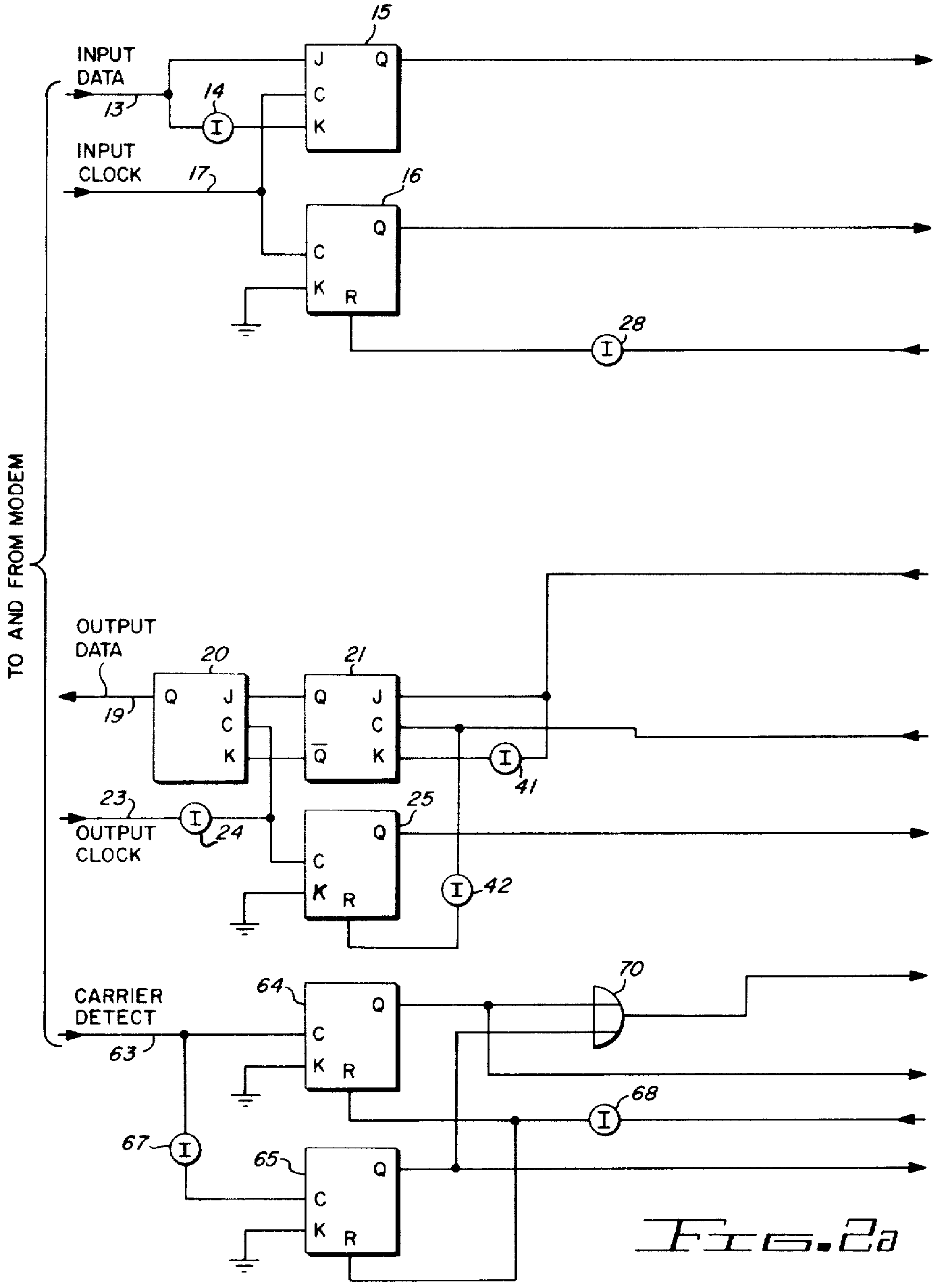
FIGS. 2*a* and 2*b* show a simplified schematic diagram of a typical subchannel constructed in accordance with teachings of the present invention.
Figure 2B:
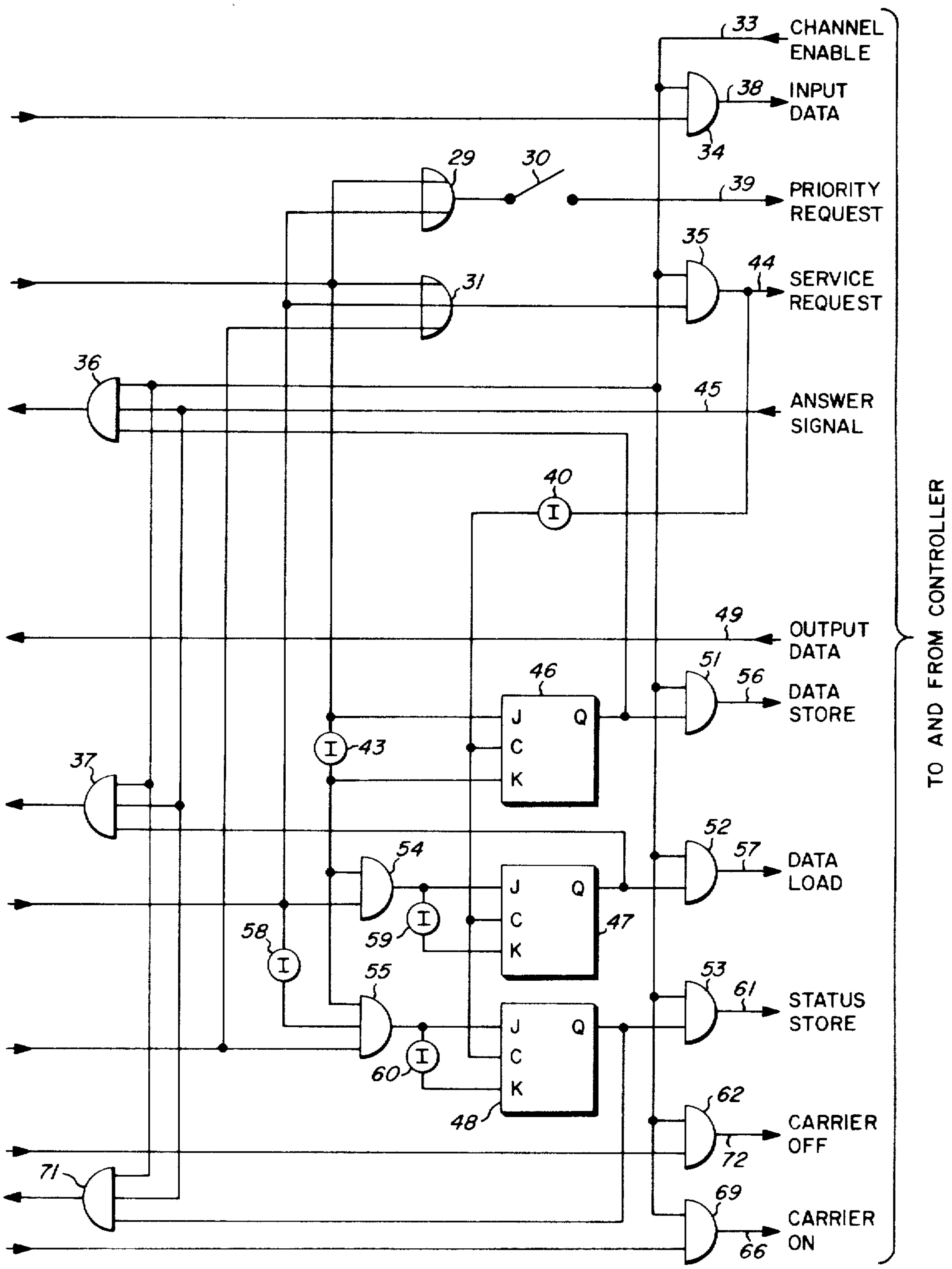
Figure 3A:
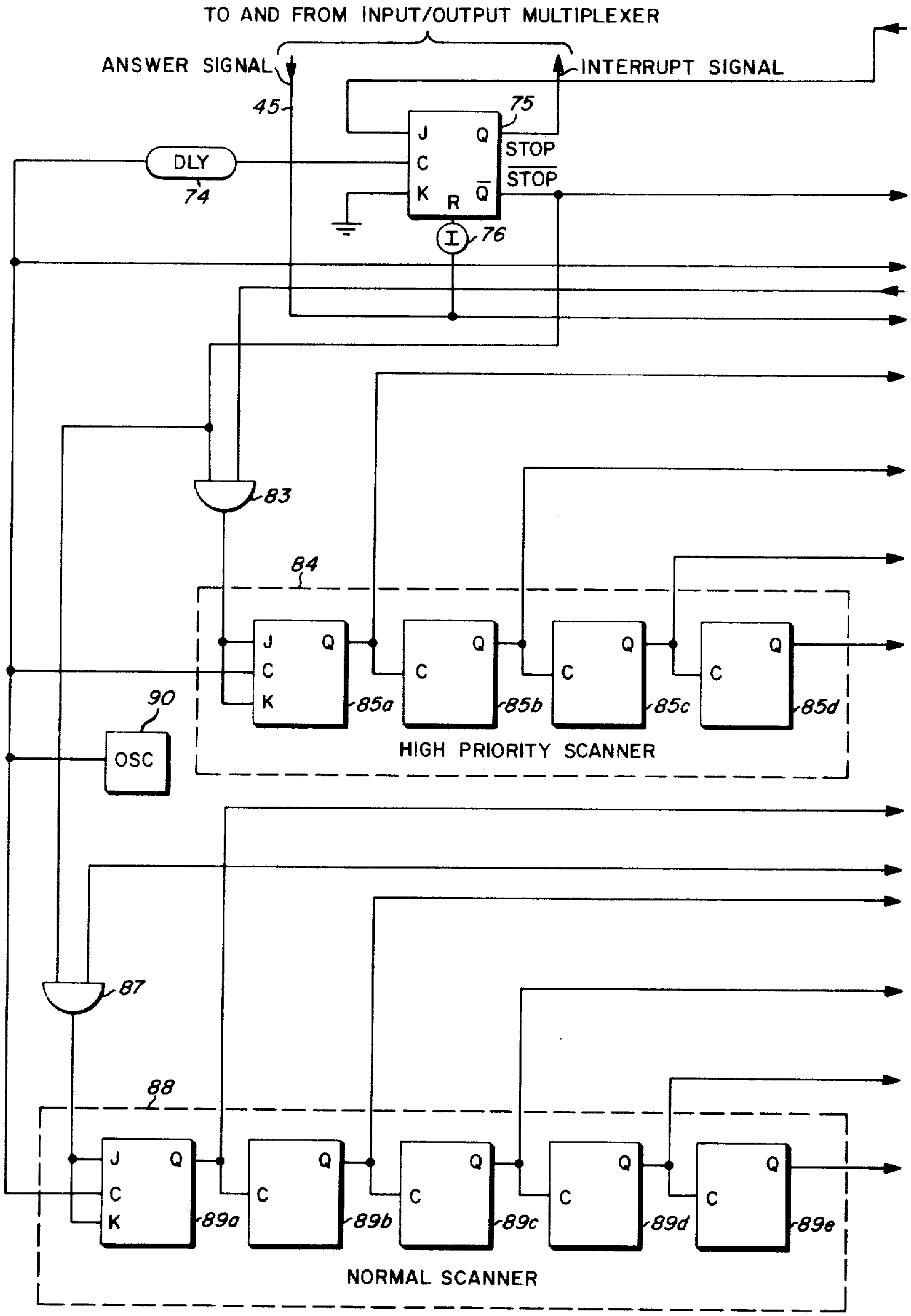
FIGS. 3*a*, 3*b* and 3*c* show a simplified schematic diagram of a data communications controller constructed in accordance with the teachings of the present invention.
Figure 3B:
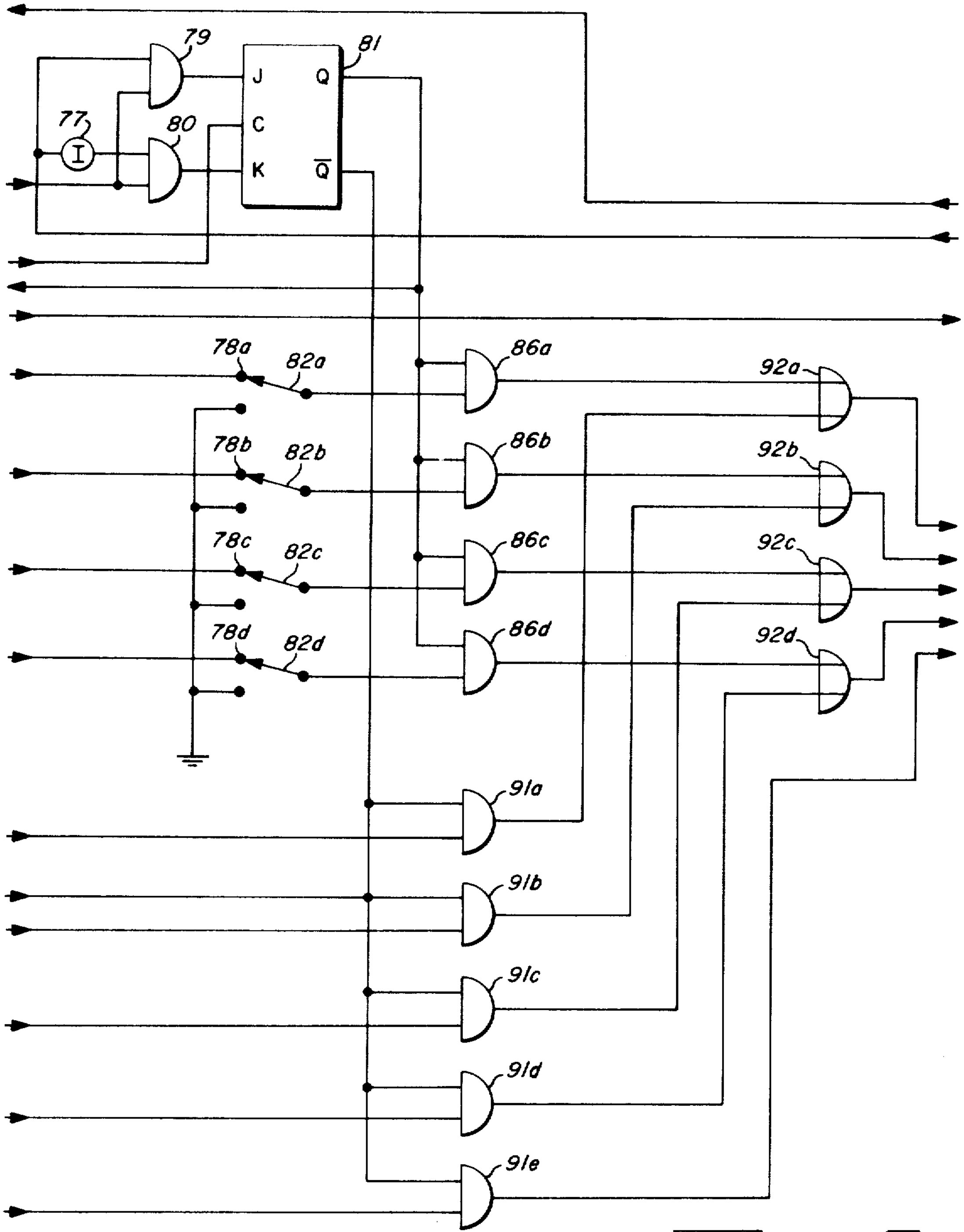
Figure 3D:
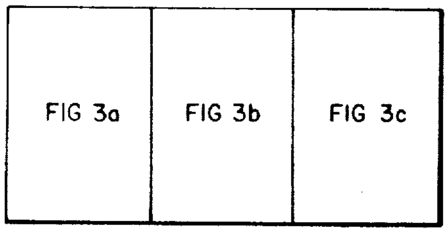
FIG. 3*d* shows the interconnection of FIGS. 3*a* -3*c*.
Figure 3C:
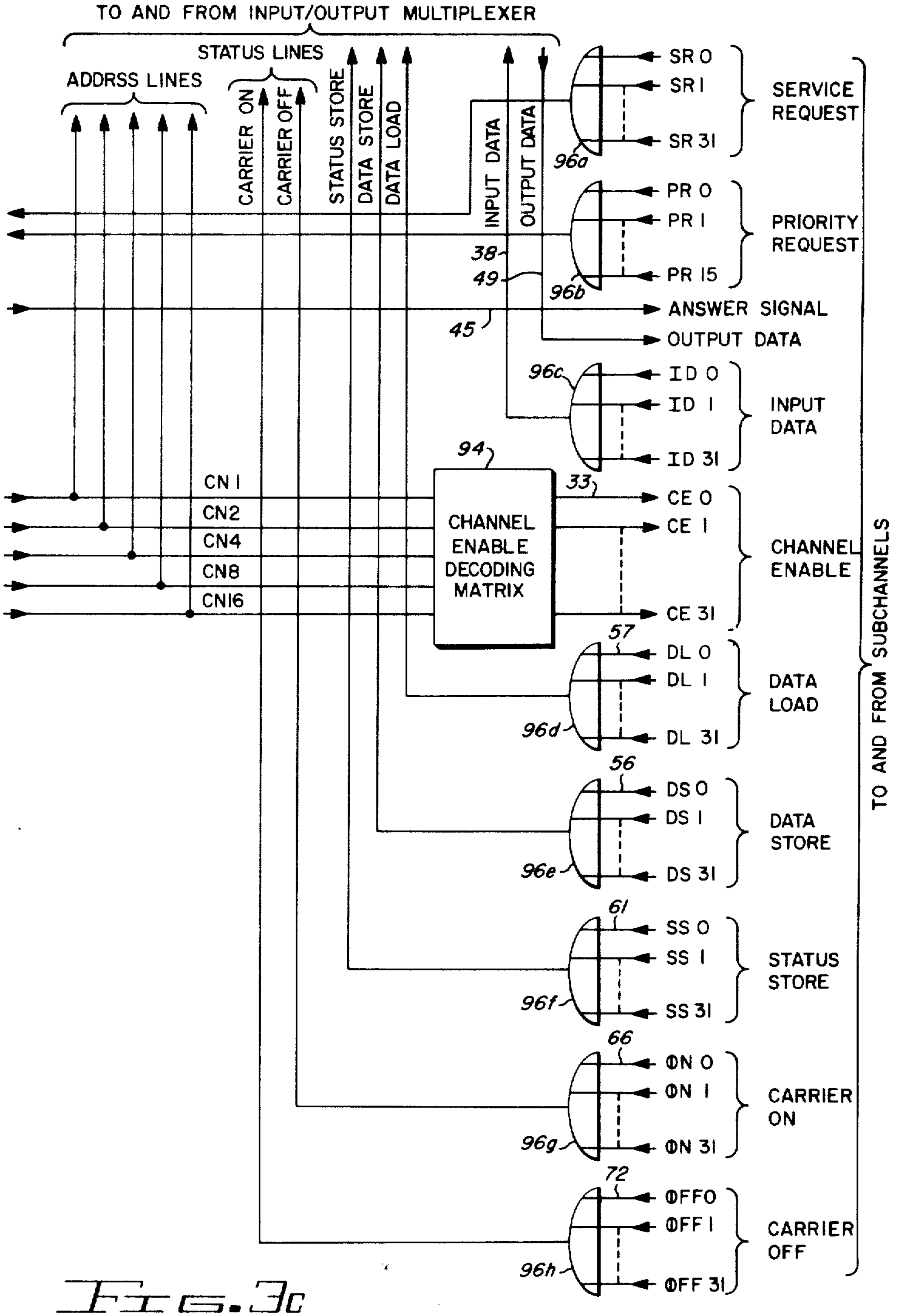
Figure 4:
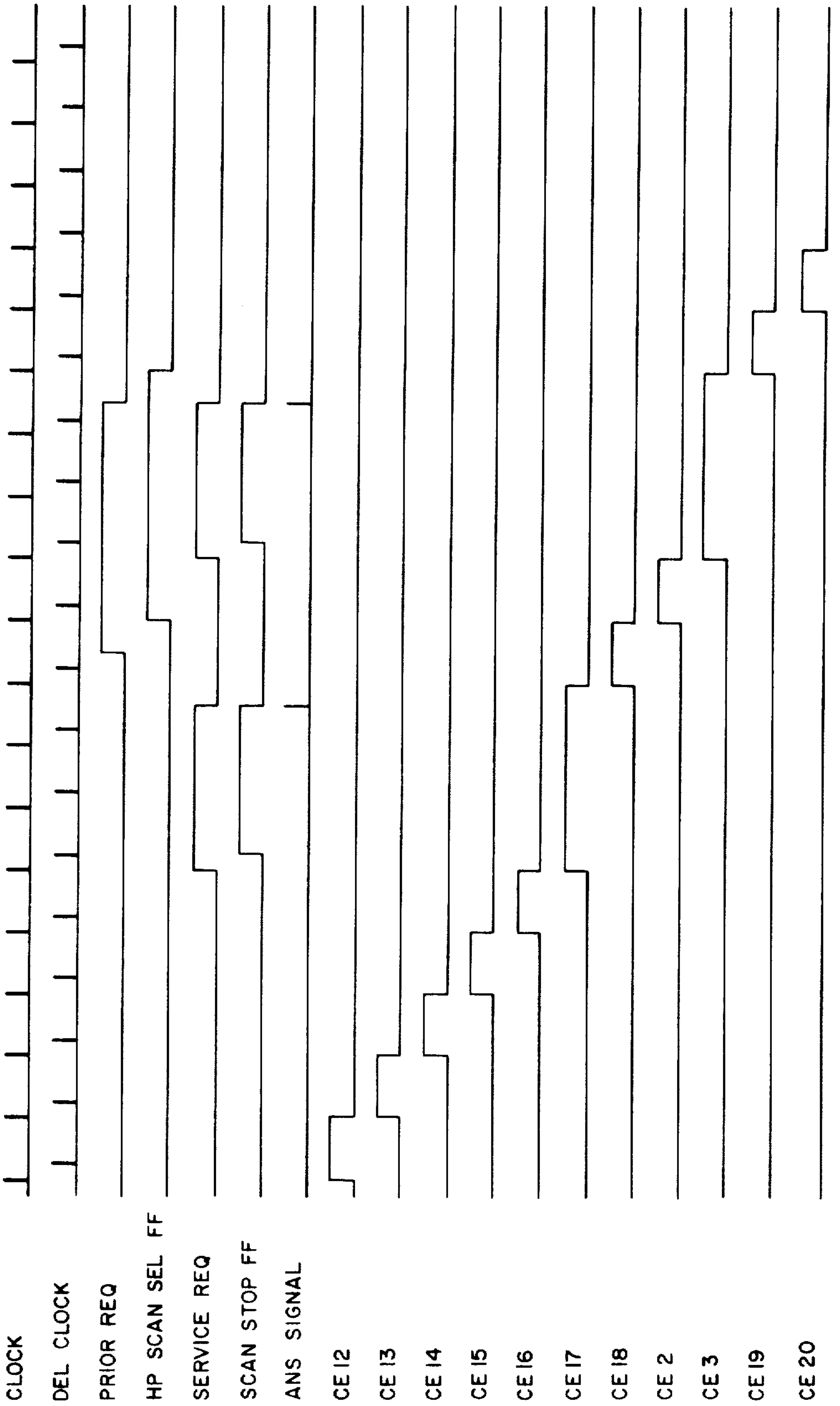
FIG. 4 illustrates waveforms which are useful in explaining the operation of the invention shown in FIGS. 2 and 3.

The AND-gates disclosed in the drawings and particularly in FIGS. 2*a*, 2*b*, 3*a*, 3*b* and 3*c* provide the logical operation of conjunction of binary signals applied thereto. In the system disclosed, since the binary 1 is represented by a positive signal, and AND-gates provide the positive output signal representing a binary 1 when, and only when all of the input signals applied thereto are positive and represent binary 1's. The symbols identified by the numerals 51–54 in FIG. 2*b* represent two-input AND-gates. Such AND-gates deliver a binary 1 output signal only when each of the two-input signals applied thereto represent a binary 1. A three-input AND-gate, such as represented by AND-gate 55, delivers a binary 1 output only when each of the three-input signals represent a binary 1.

OR-GATE

The OR-gate disclosed in FIGS. 2*a* and 2*b* provides a logical operation of inclusive-OR for binary 1 input signals applied thereto. In the system, since the binary 1 is represented by positive signals, the OR-gate provides a positive output signal representing a binary 1 when any one or more of the input signals applied thereto are positive and represent binary 1's. The symbol identified by gate 31 in FIG. 2*b* represents a three-input OR-gate. This OR-gate delivers a binary 1 output signal when any one or more of its input signals applied thereto represent a binary 1.

INVERTER

The inverter disclosed in FIG. 2*a* and represented by numerals 14, 28, etc., provides a positive output signal representing a binary 1 when the input signal applied thereto is negative, representing a binary 0. Conversely, the inverter provides an output signal representing a binary 0 when the input signal represents a binary 1.

FLIP-FLOP

The flip-flops or bistable multivibrators referred to in the specification, and shown, for example, in FIG. 3*a* of the drawings, are circuits adapted to operate in either one of two stable states and to transfer from the state in which they are operating to the other stable state upon the application of a trigger signal thereto. In one state of operation, the flip-flop represents the binary 1 (1-state) and in the other state the binary 0 (0-state). The three leads entering the left-hand side of the flip-flop symbol, for example, flip-flop number 75, shown in FIG. 3*a*, provides the required trigger signals. The upper lead, the J-lead, provides the set signal, the lower lead, the k-lead, provides the reset input signal and the center lead provides the trigger signal. When this set input signal, on the J-lead, is positive and the reset signal, on the K-lead is zero, a change from a positive voltage to a zero value of voltage, on the C-lead, causes the flip-flop to transfer to its 1-state, if it is not already in the 1-state. When the reset signal is positive and the set signal is zero, a change from a positive voltage to a zero value of voltage, on the C-lead, causes the flip-flop to transfer to the 0-state if it is not already in the 0-state.

When the J and K input leads are both positive, or when the J- and K-leads are not connected to an external signal source, a positive trigger pulse causes the flip-flop to change states. The R-lead entering the bottom of the flip-flop also provides reset signals. When a zero voltage potential is applied to the R-lead, the flip-flop resets to the 0-state and remains in the 0-state as long as the zero voltage potential remains on the R-lead, irrespective of any signals on the J-, C- and K-leads. Some flip-flops do not provide the R-lead. The two leads leaving the right-hand side of the flip-flops deliver the output signal for each flip-flop. The upper output leads, the Q-leads, deliver the 1-output signal of the flip-flop and the $\overline{Q}$-output leads, deliver the 0-output signals.

SCANNER

The operation of the scanners used in the controller can be more clearly seen by referring to the normal scanner or counter 88 in FIGS. 3*a*, 3*b* and 3*c*. Pulses from the oscillator 90 are coupled to the input of the normal scanner 88 which comprises a plurality of flip-flop 89*a*–89*e*. When a positive voltage from AND-gate 87 is applied to the J- and K-inputs of flip-flop 89*a*, each of the trigger pulses applied to the C-input causes flip-flop 89*a* to change states. When two pulses have been received at the input of flip-flop 89*a*, a positive output voltage is produced at the Q-output lead of flip-flop 89*b* and is applied to one lead of AND-gate 91*b*. When eight pulses have been received at the input lead of flip-flop 89*a*, a positive voltage is applied from the Q-output lead of flip-flop 89*d* to the C-lead of flip-flop 89*e* and to one lead of AND-gate 91*d*. When 12 pulses have been received a positive voltage from both the Q-output lead of flip-flop 89*c* and the Q-output lead of 89*d* is applied to the input leads of AND-gates 91*c* and 91*d*. When a positive voltage from flip-flop 81 is applied to the other leads of AND-gates 91*c* and 91*d* the positive signals from scanner 88 are coupled through OR-gates 92*c* and 92*d* to provide a positive signal on each of the leads CN4 and CN8. A more complete discussion of the binary scanner or binary counter shown in FIG. 3 can be found in the textbook "Digital Computer Fundamentals," second edition, by Thomas C. Bartee, McGraw Hill, 1966 on pages 94–96.

Figure 6:
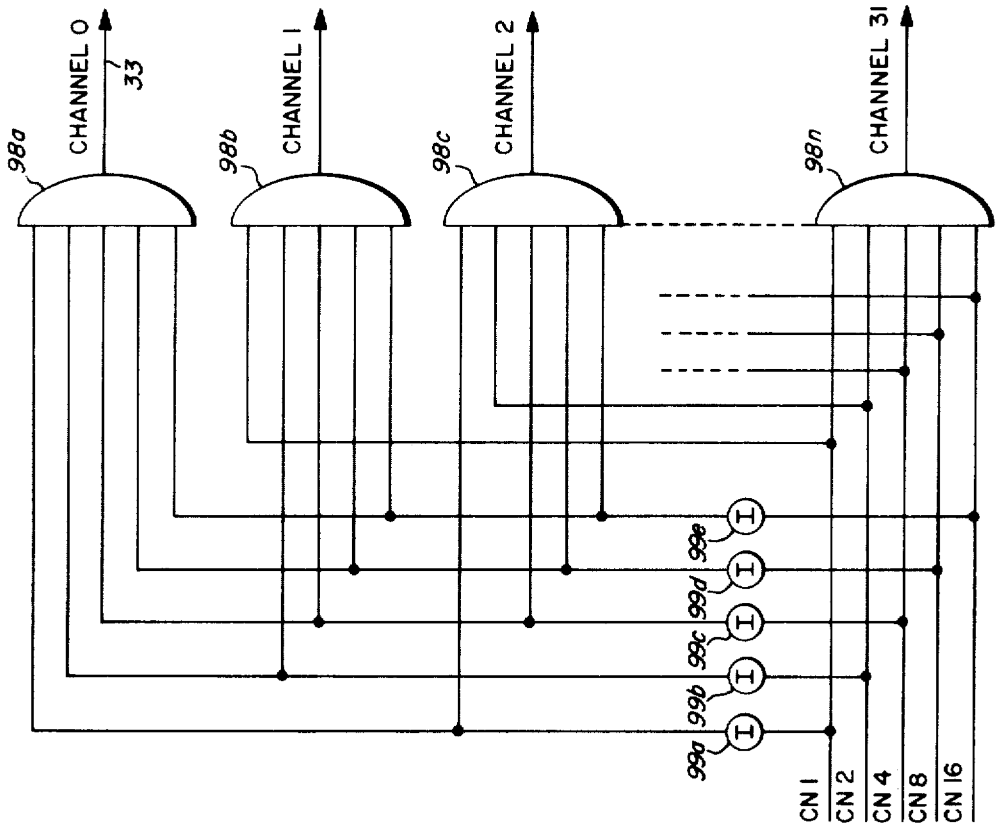
FIG. 6 comprises a schematic diagram showing details of the channel enable decoding matrix of FIG. 3.
Figure 5:
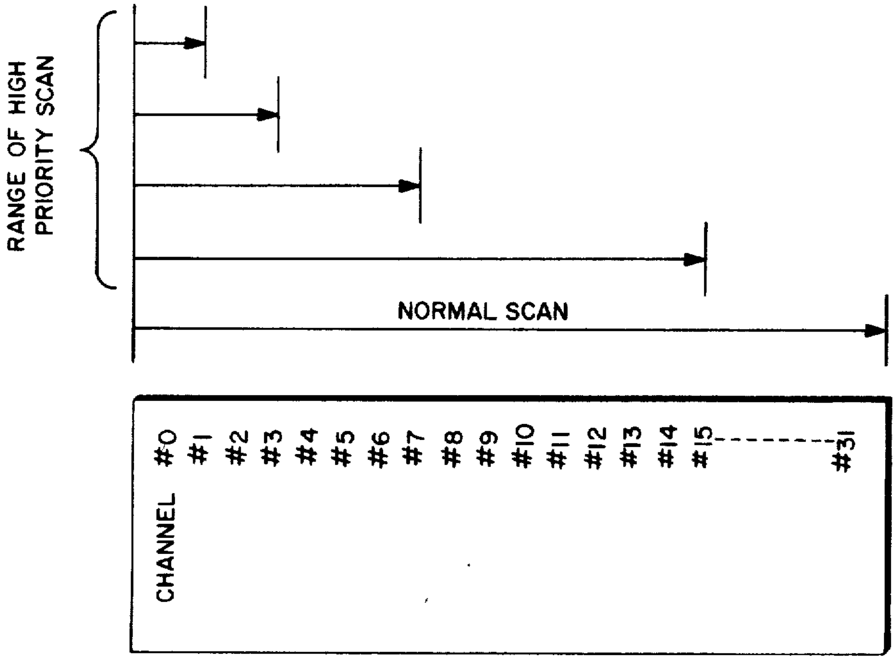
FIG. 5 illustrates the various methods of scanning which may be employed by the communications controller shown in FIG. 3.

Signals from the Q-output leads of flip-flops 89*a*–89*e* of the scanner 88 are coupled through AND-gates 91*a*–91 and OR-gates 92*a*–92*d* to the leads CN1–CN16 which are coupled to the channel enable decoding matrix 94. The channel enable decoder matrix 94 is shown in more detail in FIG. 6. The signals from the leads Cn1–CN16 are selectively coupled to the AND-gates 98*a*–98*n* and are applied to the inverters 99*a*–99*e*. INverters 99*a*–99*e* invert the signals which are also selectively coupled to AND-gates 98*a*–98. For example, the inverted signals are applied to the input leads of AND-gate 99*a* so that a positive signal is developed at the output of AND-gate 99*a* when the count in the counter or scanner 88 is equal to zero. This positive signal provides an enable signal to subchannel 0 shown in FIG. 1. When the first pulse is applied to the trigger lead of flip-flop 89a in the scanner 88, a positive signal is applied on the CN1 output lead, thereby providing a positive signal to the upper lead of AND-gate 98b. All of the other leads CN2–CN16 have a signal representing a binary zero which is inverted by inverters 99b–99e respectively and applied to the other leads of AND-gate 98b causing gate 98b to provide a positive signal at the output lead of AND-gate 98b thereby providing a positive enable signal to channel 1. As the count in the scanner 88 proceeds, the leads from the flip-flops 89a–89e provide positive signals which sequentially enable the other gates 98a–98n to sequentially provide an enable signal to each of the other subchannels of the system shown in FIG. 1. These enable signals are coupled to the subchannels on input leads 33 shown in FIGS. 2a, 2b, 3a, 3b and 3c.

The operation of the communications controller 5 will now be described in connection with FIGS. 2a, 2b, 3a, 3b and 3c, 4, 5 and 6. FIGS. 2a and 2b show a typical subchannel which may be connected between the local modem and the communications controller shown in FIG. 1. The subchannel shown in FIGS. 2a and 2b communicates with the modem over the lines shown on the left-hand side of the FIG. 2a and communicates with the communications controller over the lines shown on the right-hand side of FIG. 2b. FIGS. 2a and 2b are drawn to be placed side by side so that the leads from the right side of FIG. 2a are connected to the leads from the left side of FIG. 2b. The subchannel receives input data, timing signals and carrier detect signal from the modem and sends output data to the modem over line 19. The subchannel receives channel-enable signals, answer signals and output data from the controller over lines shown at the right-hand side of the sheet and supplies input data and a plurality of commands to the communications controller over other lines shown at the right-hand side of the FIG. 2b.

When the modem is in operation, timing signals are continuously supplied to the subchannel over input lines 17 and 23 and input data is supplied over line 13. When a binary bit of data is applied to line 13, this binary bit and the timing signal on line 17 cause the binary bit to be set into input-data flip-flop 15 and the timing signal also sets the bit-ready flip-flop 16. When the bit-ready flip-flop 16 is set a binary one which is developed at the Q-output lead is transferred through OR-gate 31 to one lead of AND-gate 35. When the channel-enable signal from the communications controller is supplied to the particular channel over line 33, gate 35 is enabled so that a service-request signal is supplied to the communications controller. The binary 1 from the Q-output lead of flip-flop 16 also sets the store-command flip-flop 46. At this same time, the channel enable signal enables AND-gate 34 so that the binary bit which was stored in input-data flip-flop 15 is gated through gate 34 to line 38 which provides input data to the communications controller. The service-request signal is applied to OR-gate 96a in the communications controller shown in FIG. 3c and is coupled to the J-input lead of the scan flip-flop 75 in FIG. 3a. FIGS. 3a, 3b and 3c are drawn to be placed side by side as shown in FIG. 3d. Leads from the right side of FIG. 2a are connected to the leads from the left side of FIG. 2b. Leads from the right side of FIG. 2b are connected to the leads from the left side of FIG. 2c.

The service-request signal on the J-lead of scan flip-flop 75 and the oscillator pulse which is delayed by delay line 74 and applied to the C-input lead cause the flip-flop 75 to be set and to provide a binary 1 at the Q-output lead. The binary 1 from the Q-output lead of flip-flop 75 provides an interrupt signal to the input/output multiplexer, FIG. 1, which provides an answer signal when the input/output multiplexer has accepted the data. This answer signal which is provided on line 45 is coupled to line 45 of the subchannel and is applied to one lead of AND-gate 36. The channel-enable signal from line 33 is applied to a second lead of AND-gate 36. The binary 1 from the Q-output lead of bit-ready flip-flop 16 has previously set the store command flip-flop 46 so that flip-flop 46 provides a binary 1 at its Q-output and supplies a third binary 1 to the input of AND-gate 36. These binary 1's cause the answer signal from the controller to be grated through the inverter 28 and to provide a reset signal to bit ready flip-flop 16. The answer signal also provides a pulse to inverter 76 which inverts the pulse and causes scan flip-flop 75 to be reset, thereby providing a binary 1 at the $\overline{Q}$-output lead of flip-flop 75.

The binary 1 at the $\overline{Q}$-output lead of flip-flop 75 enables AND-gates 83 and 87 so that signals from scanner-select flip-flop 81 are coupled to the J- and K-input leads of either flip-flop 85a in the high priority scanner 84 or are coupled to flip-flop 89a in normal scanner 88. These signals from the scanner-select flip-flop select either the high priority scanner or the normal scanner to provide scanning signals to the channel enable decoding matrix 94.

When it is desired that the normal scanner be used on all subchannels the switch 30 (FIG. 2b) in each subchannel is open so that a low value of voltage representing a binary 0 is coupled on line 39 to the communications controller of FIGS. 3a, 3b and 3c. This binary 0 is coupled through OR-gate 96b and inverted by inverter 77 causing scanner-select flip-flop 81 to be reset and to provide a binary 1 at the $\overline{Q}$-output lead. The binary 1 at the $\overline{Q}$-output lead enables AND-gates 91a–91 and AND-gate 87 so that the normal scanner 88 provides signals to the channel enable decoding matrix 94.

When the modem is ready to receive data from the subchannel, timing signals are provided over line 23 to the bit-request flip-flop 25 thereby setting flip-flop 25. When the bit-request flip-flop 25 is set a binary 1 from the Q-output lead is coupled through OR-gate 31 and AND-gate 35 to the communications controller. At this time if the bit-ready flip-flop 16 is reset the binary 0 from the Q-output lead is inverted by inverter 43 and applied to one lead of the AND-gate 54 of FIG. 2b. The binary 1 from the Q-output lead of bit-request flip-flop 25 is applied to the other lead of AND-gate 54 thereby causing the load-command flip-flop 47 to be set. The binary 1 from the Q-output lead of load-command flip-flop 47 and the answer signal from the input/output multiplexer on line 45 and the channel-enable signal on line 33 enable AND-gate 37 so that data from the input/output multiplexer on line 49 is gated into the output-data flip-flop 21 (FIG. 2*a*). When the next timing pulse is received by the subchannel, the data bit in output-data flip-flop 21 is gated into output flip-flop 20 and is coupled over line 19 to the modem.

Whenever a carrier signal from the modem changes, for example, the carrier comes on or the carrier goes off, a voltage is provided over line 63 to the subchannel. When the carrier goes off, a negative going signal is applied to the carrier-off flip-flop 64 thereby setting flip-flop 64. When the carrier comes on a positive going signal on line 63 is inverted by inverter 67 and sets the carrier-on flip-flop 65. Signals from carrier-off flip-flop 64 and carrier-on flip-flop 65 may be coupled through OR-gate 70, OR-gate 31 and AND-gate 35 to provide a service-request signal to the communications controller. The signal from the carrier-off flip-flop is also coupled through AND-gate 62 to the communications controller and the signal from the carrier-on flip-flop 65 is coupled through AND-gate 69 to the communications controller. The data-load signals, the data-store signals, the status-store signals, the carrier-on signals, and the carrier-off signals are coupled through AND-gates 96*d*–96*h* (FIG. 3*c*) to the input/output multiplexer shown in FIG. 1.

When it is desired that the subchannel shown in FIGS. 2*a* and 2*b* be used as a high priority subchannel, the switch 30 is closed. Thus, each time that the bit is ready to be transferred from the subchannel to the communications controller, a signal from the Q-output lead of the bit-ready flip-flop 16 is applied through OR-gate 29 and switch 30 to the priority request line 39 and to the communications controller. If a bit is ready to be sent to the modem the bit-request flip-flop 25 is set so that a binary 1 is available at the Q-output lead of flip-flop 25. This binary 1 is coupled through OR-gate 29 and switch 30 to the priority request line 39. The priority-request signal on line 39 (FIGS. 3*a*, 3*b* and 3*c*) is coupled through OR-gate 96*b* to the one input lead of AND-gate 79. The other input lead to AND-gate 79 is enabled by the signal from the $\overline{Q}$ lead of scan flip-flop 75 so that the scanner-select flip-flop 81 is set when the next pulse from oscillator 90 is applied to the C-input lead. When flip-flop 81 is set, a binary 1 at the Q-output lead enables AND-gates 86a-86d so that the output of the high priority scanner 84 will be coupled to the channel decoding matrix 94 and out to the various subchannels. At this time a binary 0 from the $\overline{Q}$ output lead disables AND-gate 87 so that the normal scanner 88 is disabled and scanning by scanner 88 is halted.

Figure 7:
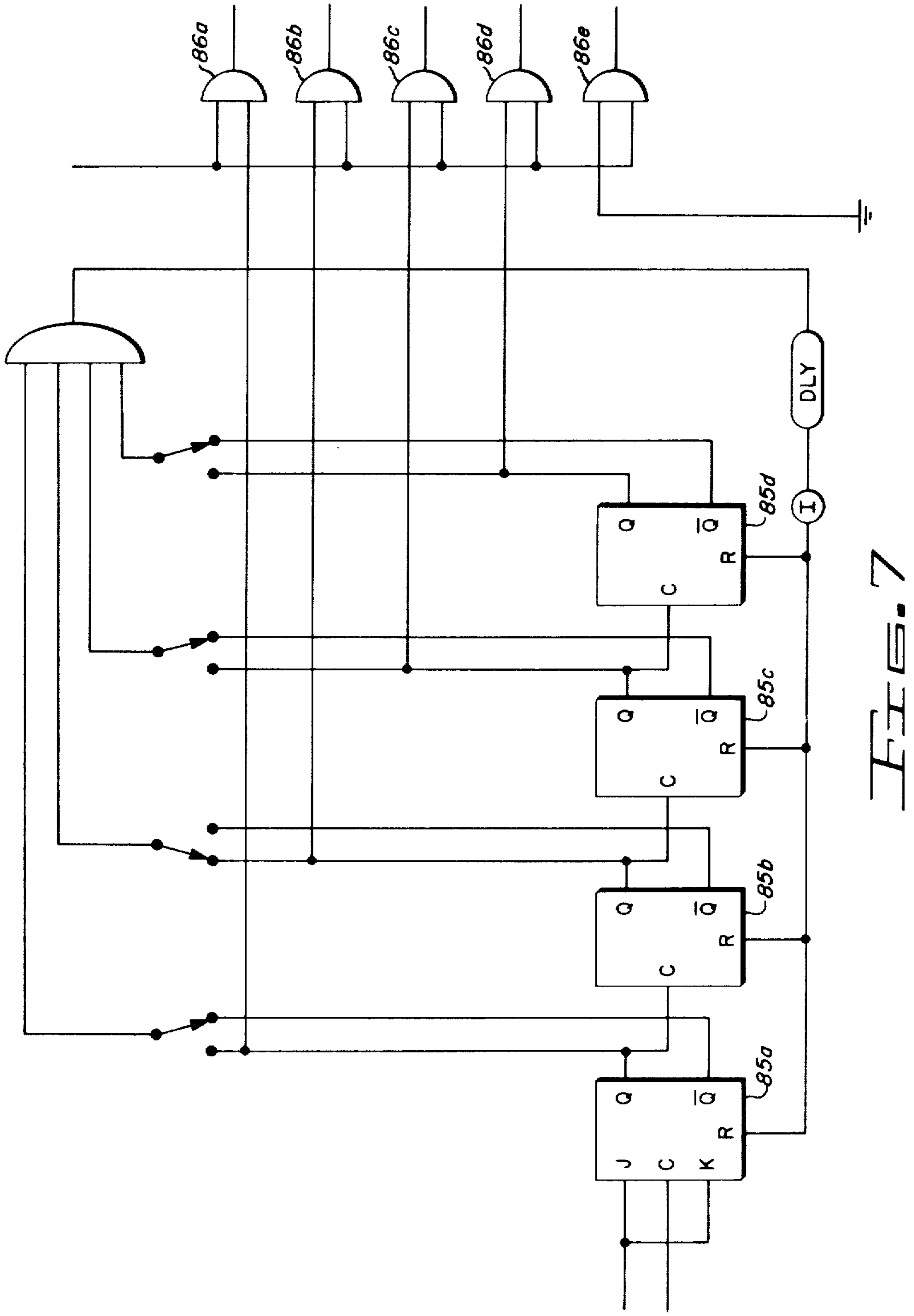
FIG. 7 shows another embodiment of the high priority scanner of FIG. 3.

When it is desired that only two high priority subchannels be used with the communications controller shown in FIGS. 3*a*, 3*b* and 3*c*, the switch 82*a* in FIG. 3*b* is connected to the contact 78*a*. Switches 82*b*, 82*c* and 82*d* are each connected to the ground contacts. With the switches in the above position, only the binary bit from the flip-flop 85*a* is coupled through gate 86*a* to the channel-enable decoder matrix 94 so that only subchannel 0 and subchannel 1 are scanned by the high priority scanner. When it is desired that more than two subchannels be used as high priority channels, other of the switches 82*a*–82*d* are connected to the corresponding contacts 78*a*–78*d*. For example, when it is desired that eight subchannels be used as high priority channels, the switches 82*a*, 82*b* and 82*c* are connected to contacts 78*a*, 78*b* and 78*c* respectively. When it is desired that 16 subchannels be used as high priority channels, all of the switches 82*a*–82*d* are connected to their respective contacts 78*a*–78*d*. Thus, it can be seen that the high priority scanner shown in FIG. 3 causes the communications controller to scan two channels, four channels, eight channels or 16 channels as high priority channels. If it is desired that other numbers of channels be scanned such as three or five, another embodiment of the high priority scanner, shown in FIG. 7, can be used. The scanner shown in FIG. 7 can be used to continuously select any number from one channel to 16 channels for high priority channels. It should be understood that more than 16 channels can be scanned by including additional flip-flops and additional switches in the circuit shown in FIG. 7.

When all of the high priority subchannels, as shown in FIGS. 2*a* and 2*b*, have been serviced, the bit-ready flip-flops 16 and the bit-request flip-flops 25 in each of the subchannels are reset so that there are no longer any signals on the priority request lines 39 from the subchannels to the communications controller. When there is no signal on line 39 there is no signal from OR-gate 96*b* in the communications controller so that the voltage applied to the input of AND-gate 79 (FIG. 3b) is low and AND-gate 79 is disabled. The low value of voltage is inverted by inverter 77 and applied to one lead of AND-gate 80 so that the binary 1 from the $\overline{Q}$-lead of scan flip-flop 75 is coupled through AND-gate 80 and resets the scanner-select flip-flop 81. When flip-flop 81 is reset, a binary 1 from the $\overline{Q}$ output lead flip-flop 81 is coupled to one lead of AND-gates 91*a*–91*e* so that gates 91*a*–91*e* are enabled. The normal scanner 88 is again coupled to the channel enable decoding matrix 94 and all of the subchannels will be sequentially scanned by the communications controller.

If the normal scanner is providing channel-enable signals to one of the channels 17–31 at the time that a priority-request signal is received from one of the high priority subchannels, normal scanner 88 will stop scanning. However, the communications controller will finish servicing the subchannel which was being serviced at the time the priority-request signal was received. The high priority scanner will start scanning the high priority channels which are determined by the settings of the switches 82*a*–82*d*. When the priority-request signal is no longer applied to the communications controller, the normal scanner will resume scanning the channels starting with the next channel which is due to be serviced. For example, if the normal scanner had stopped on subchannel 19 at the time the priority-request signal caused the high priority scanner to start operations, the normal scanner will resume scanning at subchannel 20.

A priority of commands from the subchannel to the controller is established by flip-flops 46, 47, 48, inverters 45, 58, 59, 60 and AND-gates 54 and 55. Only one of the flip-flops 46, 47 and 48 can be set at any given time so that only one of the data-store, data-load and status-store signals can be sent to the communications controller at any given time. The flip-flops 46, 47 and 48 are set by signals from flip-flops 16, 25, 64 and 65.

When bit-ready flip-flop 16 is set a binary 1 from the Q-output lead and a service-request signal from AND-gate 35 cause store-command flip-flop 46 to be set and to provide a data-store command to the communications controller. The binary 1 from flip-flop 16 is inverted by inverter 43 and disables AND-gates 54 and 55 so that flip-flops 47 and 48 cannot be set.

When bit-request flip-flop 25 is set and bit-ready flip-flop 16 is reset a binary 0 from the Q-output lead of flip-flop 16 is inverted by inverter 43 and applied to one lead of AND-gate 54 thereby enabling AND-gate 54 so that a binary 1 from the Q-output lead of flip-flop 25 causes load-command flip-flop 47 to be set and to provide a data-load command to the controller. The binary 1 from flip-flop 25 is inverted by inverter 58 and disables AND-gate 55 so that flip-flop 48 cannot be set.

When flip-flops 16 and 25 are both reset a binary 0 from the Q-output leads of flip-flops 16 and 25 are inverted by inverters 43 and 58 and applied to AND-gate 55 thereby enabling AND-gate 55 so that a binary 1 from the Q-output lead of either carrier-OFF flip-flop 64 or carrier-ON flip-flop 65 cause status-command flip-flop 48. When flip-flop 48 is set a binary 1 from the Q-output lead provides a status-store command to the communications controller.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

I claim:

1. A data communication system having dual scanners for selectively providing signals to a plurality of subchannels, at least one of said subchannels having a source of priority signals, and system comprising:

first and second counters each having a plurality of flip-flops, said first counter having a greater number of flip-flops than said second counter, said flip-flops of said first and said second counters each having an input terminal and an output terminal;

an oscillator, said oscillator being coupled to said input terminal of a first flip-flop in said first counter and to said input terminal of a first flip-flop in said second counter;

a source of enabling signals, said source supplying enabling signals, said enabling signals causing a counter to operate when said source is connected to a first flip-flop in said first counter;

switching means having an input lead and first and second output leads, said input lead of said switching means being connected to said source of enabling signals, said first output lead of said switching means being coupled to said input lead of said first flip-flop in said first counter, said second output lead of said switching means being coupled to said input terminal of said first flip-flop in said second counter;

a plurality of switches, each of said switches being connected to a corresponding one of said output terminals of said flip-flops in said second counter;

a scanner-select flip-flop having an input terminal and first and second output terminals;

a decoding matrix having a plurality of input leads and a plurality of output leads, each of said output leads of said matrix being coupled to a corresponding one of said subchannels;

means for connecting said source of priority signals to said input terminal of said scanner-select flip-flop; and a plurality of AND-gates each having first and second input leads and an output lead, said gates being divided into first and second groups, said first input lead of each of said AND-gates in said first group being connected to said first output terminal of said scanner-select flip-flop, said second input lead of said AND-gates in said first group being connected to an output terminal of a corresponding one of said flip-flops in said first counter, said first input lead of each of said AND-gates in said second group being connected to said second output terminal of said scanner-select flip-flop, said second input lead of said AND-gates in said second group being connected to a corresponding one of said switches, said output leads of each of said AND-gates in said first and said second groups being coupled to a corresponding one of said input leads of said decoding matrix.

* * * * *